United States Patent
Carlson et al.

(10) Patent No.: US 9,891,448 B2
(45) Date of Patent: Feb. 13, 2018

(54) TINTED POLARIZED LENSES HAVING SELECTIVE FREQUENCY FILTERING

(71) Applicant: Smith Optics, Inc., Ketchum, ID (US)

(72) Inventors: Eric Carlson, Ketchum, ID (US); Scott MacGuffie, Ketchum, ID (US)

(73) Assignee: Smith Optics, Inc., Bend, OR (US)

(*) Notice: Subject to any disclaimer, the term of this patent is extended or adjusted under 35 U.S.C. 154(b) by 0 days.

(21) Appl. No.: 14/455,494

(22) Filed: Aug. 8, 2014

(65) Prior Publication Data
US 2016/0041408 A1    Feb. 11, 2016

(51) Int. Cl.
| G02C 7/12 | (2006.01) |
| G02B 1/10 | (2015.01) |
| G02B 1/08 | (2006.01) |
| G02C 7/10 | (2006.01) |
| G02B 5/30 | (2006.01) |

(52) U.S. Cl.
CPC ............. *G02C 7/10* (2013.01); *G02B 1/08* (2013.01); *G02B 5/3033* (2013.01); *G02C 7/108* (2013.01); *G02C 7/12* (2013.01); *G02C 7/102* (2013.01); *G02C 2202/16* (2013.01)

(58) Field of Classification Search
CPC . G02C 7/12; G02C 7/10; G02C 7/108; G02C 2202/16; G02C 7/102; G02B 5/3033; G02B 1/10; G02B 1/08; B29D 11/0073
USPC ..................................................... 351/159.56
See application file for complete search history.

(56) References Cited

U.S. PATENT DOCUMENTS

| 5,135,298 | A | * | 8/1992 | Feltman ................... G02C 7/12 351/159.61 |
| 6,334,680 | B1 | | 1/2002 | Larson |
| 6,604,824 | B2 | * | 8/2003 | Larson ................... G02C 7/108 351/159.56 |
| 6,773,816 | B2 | * | 8/2004 | Tsutsumi .......... B32B 17/10036 351/44 |
| 7,106,509 | B2 | * | 9/2006 | Sharp ................... G02B 27/288 351/159.6 |
| 7,775,659 | B2 | * | 8/2010 | Nesty ....................... G02C 7/10 351/159.64 |
| 8,733,929 | B2 | | 5/2014 | Chiou et al. |

OTHER PUBLICATIONS

Examiner's Report for Canadian Application No. 2,890,882 dated May 31, 2016.
Second Office Action for CA Application No. 2890882, dated Apr. 18, 2017.

* cited by examiner

*Primary Examiner* — Bumsuk Won
*Assistant Examiner* — Henry Duong
(74) *Attorney, Agent, or Firm* — Dorsey & Whitney

(57) ABSTRACT

A tinted polarized lens for attenuating ambient light reducing glare and improving color discrimination for a user is disclosed. In some embodiments, the lens has uniform transmittance across the visible spectrum with selective filtering of light at 480 nm and 580 nm. In some embodiments, the lens may reduce light in the blue region of the spectrum while maintaining color discrimination. In some embodiments, the level of attenuation provided by the lens may vary based on the intensity of light present while maintaining selective filtering at 480 nm and 580 nm.

22 Claims, 10 Drawing Sheets

Polar Platinum

Elite Polar Platinum

Figure 3B  Polar Brown

Polar Bronze Mirror

Elite Polar Bronze Mirror

Polar Blue Mirror

Elite Polar Blue Mirror

Polar Chromic Ignitor

TINTED POLARIZED LENSES HAVING SELECTIVE FREQUENCY FILTERING

BACKGROUND

Tinted lenses are often used to protect a user from high levels of ambient light and glare. The tint of the lens decreases the amount of light transmitted through the lens. Glare is defined as light of sufficient brightness transmitted to an eye or optical sensor such that vision or detection is impaired. In the case of a human eye, blurring of vision, physical pain, or ocular fatigue may also be experienced when exposed to glare. Glare may be transmitted from light reflected from a surface. Surfaces may include for example, windshields, windows, water, snow, and metal.

Tinted lenses may also be polarized to protect the user from glare. Reflected light is polarized, but ambient light is not polarized. Blocking polarized light allows the lenses to block additional glare without decreasing non-polarized light transmitted through the lens, for example, by using a darker tint. This prevents the lenses from inhibiting a user's vision in lower light conditions when glare may still be present. For example, at sunrise, light may reflect strongly off a body of water, but the surrounding area may not yet be well-lit by the rising sun.

Some tinted lenses may decrease a user's ability to discriminate colors based on the light transmitted through the lens. This may be undesirable as it may prevent the user from distinguishing objects based on color. This reduced ability of a user to discriminate between colors may also be referred to as color confusion. It may also be uncomfortable to the user to view familiar objects in unfamiliar hues.

BRIEF DESCRIPTION OF THE DRAWINGS

FIG. 3B is the ANSI test performance of the lens with the transmittance spectrum shown in FIG. 3A.

DETAILED DESCRIPTION

Figures 1A, 1B:
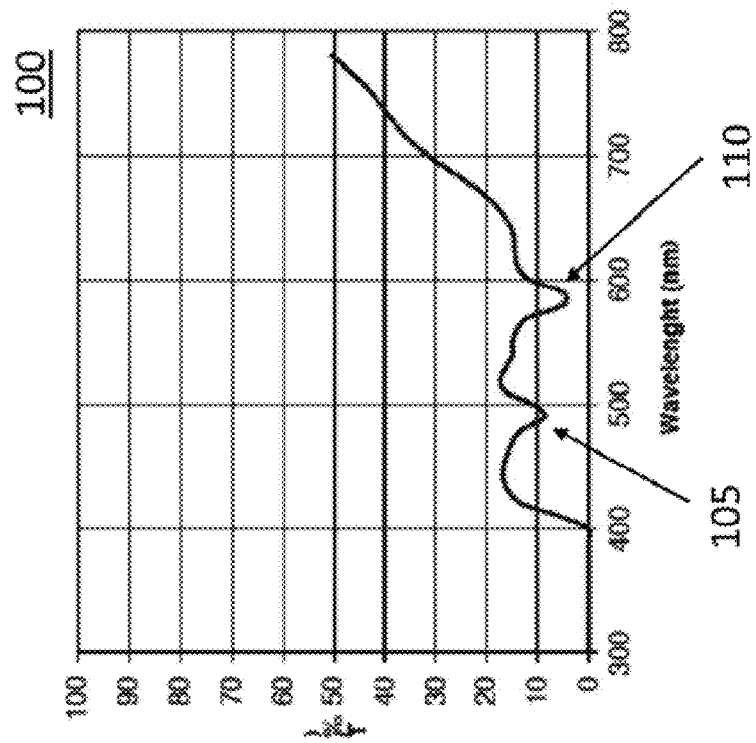
FIG. 1A is a graph showing the transmission spectrum of a gray lens.
FIG. 1B is the American National Standard Institute, Inc. (ANSI) test performance of the lens with the transmittance spectrum shown in FIG. 1A.

The present application describes apparatuses and methods for enhancing a user's color discrimination with a lens. Many specific details of certain embodiments of the disclosure are set forth in the following description and the figures provide a thorough understanding of such embodiments. One skilled in the art, however, will understand that the present embodiments of the disclosure may be practiced without several of the details and components described in the following description.

Studies have found that human color vision may be characterized by three color channels: red (peak: 610 nm), green (peak: 540 nm), and blue (peak: 450 nm). Based on the level of light detected at each of these three channels at the eye, the brain interprets the colors seen. The eye has poor chromatic response at 480 nm and 580 nm. The 480 nm wavelength corresponds to where the green and blue channels overlap. The 580 nm wavelength corresponds to where the green and red channels overlap. Light at these wavelengths may inhibit proper interpretation of colors by the brain, causing color confusion. The ability to discriminate colors may be improved by selectively filtering light at these wavelengths. In certain applications, it may be desirable to selectively filter light at 480 nm and 580 nm with a tinted polarized lens such that a user may experience decreased color confusion. When color confusion is reduced, the user may be able to discern colors more rapidly, which may increase the observed vibrancy of colors.

Polarized films may be added to a lens to reduce glare. A polarized film contains aligned particles that transmit a parallel plane of polarized light and block a perpendicular plane of polarized light. Since reflected light is polarized, the polarized film may reduce or eliminate glare transmitted through the film.

The polarized film may be a sheet of polyvinyl alcohol (PVA) which is heated and stretched to align long hydrocarbon molecules of the PVA. The sheet may then be dipped into an ink which may comprise iodine. The ink may attach to the aligned PVA molecules. The longer the sheet is exposed to the ink, the more ink attaches to the PVA molecules. The greater the ink content, the less light that is transmitted through the sheet. Different inks may be used to impregnate the PVA sheet. Amber-colored films may reduce the amount of light transmission in the blue area of the spectrum, whereas neutral-colored films do not reduce the blue area of the spectrum. The film may be incorporated into the interior of the lens or may be placed on the surface of the lens, and may be covered by a protective coating. The protective coating may be transparent or contain tinting compounds.

The lens with the polarized film may itself include an ink or other compound for absorbing light. The compounds added to the lenses may be metals, metal oxides, rare earths, or other compounds. An example of such a compound is neodymium. In some embodiments, the compounds may not be added directly to the lens but to films or coatings then applied to one or more surfaces of the lens. Multiple films or coatings may be applied to the lens in some embodiments. The lens may be designed to absorb light uniformly across the visible spectrum or it may be designed to absorb light in specific regions. The absorption of light due to the added compounds often causes the lens to appear to have a color, thus it may be referred to as tinted. The tinted lens may be glass, polycarbonate, plastic, or other suitable material. The concentration and types of absorptive compounds added to the lens may be varied to fine-tune the absorption properties across the visible spectrum, and often beyond the visible spectrum. For example, many tinted lenses are designed to block ultraviolet light that may be harmful to a user's eye, even though the eye cannot discern light at ultraviolet wavelengths. Ultraviolet light may be considered wavelengths below 400 nm.

The color of the tinted lens as a result of the added compounds does not indicate the specific absorptive characteristics of the tinted lens in the ultraviolet or infrared regions. The apparent color of the lens is based on the portions of the visible spectrum that are transmitted. For example, if a lens transmits more of the green portion of the spectrum, the lens appears to be green by the transmitted light. In another example, if the transmission is uniform across the visible spectrum, the lens may appear to be a neutral gray. A gray lens may be advantageous as it decreases the brightness of a user's surroundings without altering colors. A further advantage of gray lenses may be that users are accustomed to gray lenses and may find them more cosmetically appealing to wear than lenses of more unusual colors such as green or purple. Because of these potential advantages, it may be beneficial to produce a tinted lens that selectively filters light in the visible spectrum to enhance color discrimination while still maintaining a lens that appears gray to the user.

An example transmittance spectrum 100 of a gray tinted lens including a polarizing film is illustrated in FIG. 1A. The y-axis is the percentage of transmittance and the x-axis is the wavelength of light in nanometers. In this example, little to no light is transmitted below 400 nm to protect a user from ultraviolet radiation. A dip is a set of adjacent wavelengths or a single wavelength in a spectrum having a reduced light transmittance than the surrounding wavelengths in the spectrum. A dip is considered to increase in selectivity as fewer wavelengths are included in the dip. In the visible spectrum, light is transmitted uniformly across the spectrum except for reduced transmittance, or dips 105, 110 at 480 nm and 580 nm, respectively. The lens with the transmittance spectrum 100 exhibits a light transmittance at 450 nm is greater than the transmittance at 480 nm, a light transmittance at 510 nm that is greater than the light transmittance at 480 nm and 580 nm, and a light transmittance at 600 nm that is greater than the light transmittance at 580 nm. The selective dips at these wavelengths may allow for reduced color confusion while allowing the lens to maintain a gray appearance to the user.

FIG. 1B shows the results of an American National Standard Institute, Inc. (ANSI) test for sunglasses having the transmittance spectrum 100 illustrated in FIG. 1A. The standard requires that no wavelength will be attenuated by a lens more than 80% of the luminescent transmittance of the lens between 500 and 650 nm. Furthermore, certain color regions cannot be distorted by the lens. These standards are to prevent sunglasses from preventing a wearer from being able to see and discern traffic light signals when operating a motor vehicle.

Figures 2A, 2B:
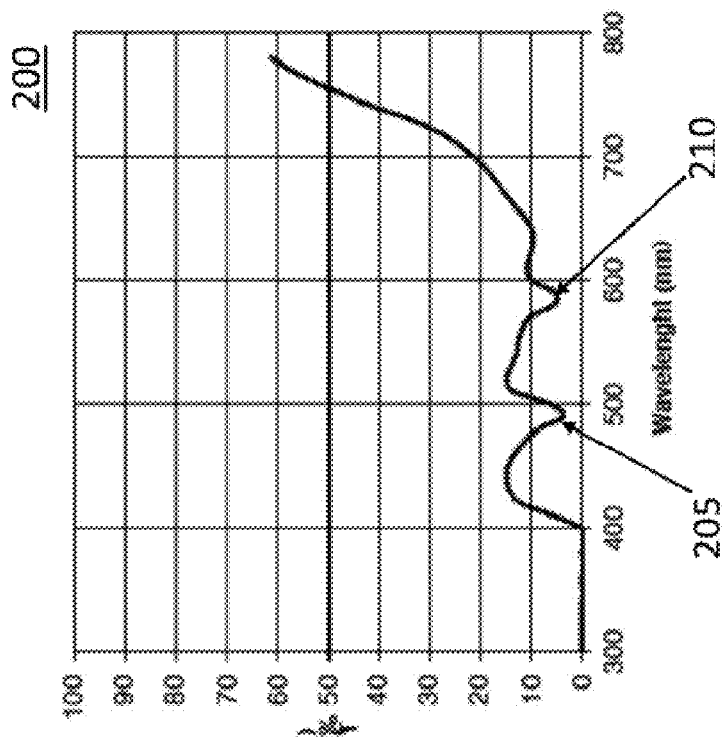
FIG. 2A is a graph showing the transmission spectrum of a second gray lens according to another embodiment of the invention.
FIG. 2B is the ANSI test performance of the lens with the transmittance spectrum shown in FIG. 2A according to an embodiment of the invention.

FIG. 2A illustrates a second example transmittance spectrum 200 of a tinted polarized lens having a gray appearance according to an embodiment of the invention. In this example, little to no light is transmitted below 400 nm to protect a user from ultraviolet radiation. In the visible spectrum, light is transmitted uniformly across the spectrum except for reduced transmittance at dips 205, 210 at 480 nm and 580 nm, respectively. The selective dips at these wavelengths may allow for reduced color confusion while allowing the lens to maintain a gray appearance to the user. This lens has a dip 205 at 480 nm that may further reduce color confusion between the blue and green channels in comparison to the lens having the spectrum illustrated in FIG. 1A as the dip 205 has a lower transmittance at 480 nm than the dip 105 at 480 nm. The transmittance spectrum 200 exhibits a light transmittance at 450 nm that is greater than the transmittance at 480 nm, a light transmittance at 510 nm that is greater than the light transmittance at 480 nm and 580 nm, and a light transmittance at 600 nm that is greater than the light transmittance at 580 nm. The overall transmittance of the lens in FIG. 2A is lower than for the lens in FIG. 1A as can be seen in the spectrum 200 in FIG. 2A and in the ANSI test results shown in FIG. 2B.

Figure 3A:
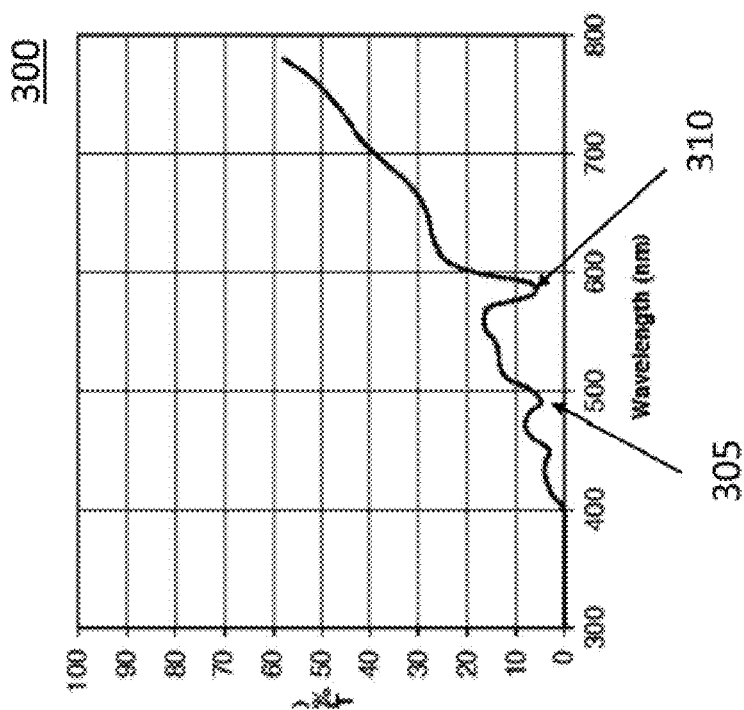
FIG. 3A is a graph showing the transmission spectrum of a brown lens.

FIG. 3A illustrates an example transmittance spectrum 300 of a tinted polarized brown lens. As discussed previously, brown lenses tend to reduce transmittance in the blue region of the spectrum. This can be seen in the spectrum 300 as a gradual slope from 480 nm to 400 nm, whereas in FIGS. 1A and 2A, the transmittance spectra are flatter in this region. The tinted polarized brown lens has reduced transmittance at dip 310 at 580 nm, and at dip 305 at 480 nm. The lens with the transmittance spectrum 300 exhibits a light transmittance at 450 nm that is less than the transmittance at 480 nm, a light transmittance at 510 nm that is greater than the light transmittance at 480 nm and 580 nm, and a light transmittance at 600 nm that is greater than the light transmittance at 580 nm. The selective dips at these wavelengths may allow for reduced color confusion while allowing the lens to maintain a brown appearance to the user. The dip 305 at 480 nm appears less pronounced in comparison to dip 310 due to the attenuation of the blue region from the amber tint. By less pronounced, it is meant that the percentage difference in transmittance between the dip wavelength and the surrounding wavelengths is less. These lenses may cause a user's vision to be dominated by colors on the red end of the spectrum, which may provide a "warm" view to the user. Some users may find this color warmth visually appealing, and may also find a brown lens more cosmetically attractive than a gray lens for some applications, FIG. 3B shows the ANSI test results for the lens with the example spectrum 300 shown in FIG. 3A.

Figures 4A, 4B:
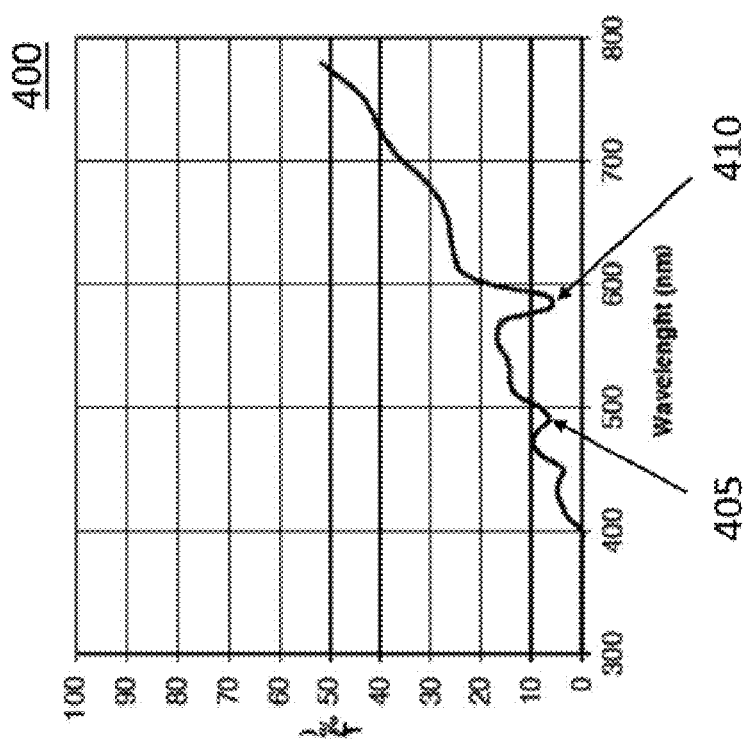
FIG. 4A is a graph showing the transmission spectrum of a brown mirrored lens according to an embodiment of the invention.
FIG. 4B is the ANSI test performance of the lens with the transmittance spectrum shown in FIG. 4A according to an embodiment of the invention.

A tinted polarized lens may have a mirrored coating on one or more surfaces of the lens. The mirror may provide additional light attenuation, selective filtering, and/or anti-glare properties. FIG. 4A illustrates an example of a transmittance spectrum 400 of a tinted polarized brown lens having a mirror coating according to an embodiment of the invention. This lens has somewhat less attenuation in the blue region of the spectrum from 400 nm to 480 nm, but has more attenuation in the red region of the spectrum in comparison to the lens with the transmittance spectrum 300 illustrated in FIG. 3A. The transmittance spectrum 400 also has the double dips 405, 410 at 480 nm and 580 nm as the other example lenses described previously. The transmittance spectrum 400 exhibits a light transmittance at 450 nm that is less than the transmittance at 480 nm, a light transmittance at 510 nm that is greater than the light transmittance at 480 nm and 580 nm, and a light transmittance at 600 nm that is greater than the light transmittance at 580 nm. The selective reduction in transmittance at these wavelengths may provide reduced color confusion. FIG. 4B shows the ANSI test results. The example lens with the transmittance spectrum 400 shown in FIG. 4A illustrates how different tints and coatings may be combined to fine-tune the spectral response properties of the lens.

Figures 5A, 5B:
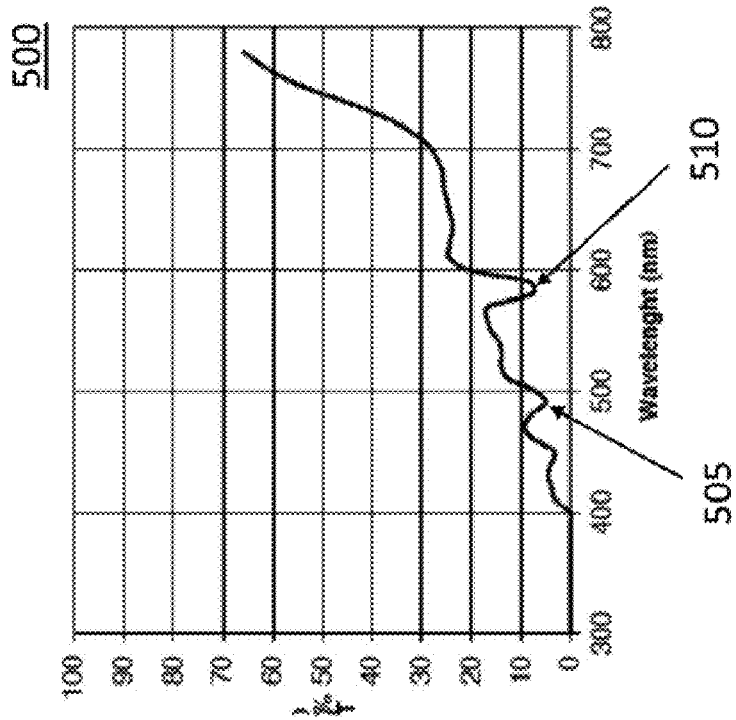
FIG. 5A is a graph showing the transmission spectrum of a second brown mirrored lens according to another embodiment of the invention.
FIG. 5B is the ANSI test performance of the lens with the transmittance spectrum shown in FIG. 5A according to another embodiment of the invention.

FIG. 5A illustrates another example transmittance spectrum 500 for a brown tinted polarized lens with a mirror coating according to an embodiment of the invention. The transmittance spectrum 500 has reduced transmittance at dips 505, 510 at 480 nm and 580 nm. The selective dips at these wavelengths may provide reduced color confusion. The lens with the transmittance spectrum 500 exhibits a light transmittance at 450 nm that is less than the transmittance at 480 nm, a light transmittance at 510 nm that is greater than the light transmittance at 480 nm and 580 nm, and a light transmittance at 600 nm that is greater than the light transmittance at 580 nm. The transmittance spectrum 500 provides a flatter spectral response between 600 nm and 700 nm than the transmittance spectrum 400. This may provide for a more balanced representation of red color tones observed by the user, for example as compared to the lens with the transmittance spectrum 300 in FIG. 3A. This may be preferred when a user does not want strongly enhanced red color tones, but still desires a lens that is brown in appearance. The ANSI test results for the transmittance spectrum 500 are shown in FIG. 5B.

Figures 6A, 6B:
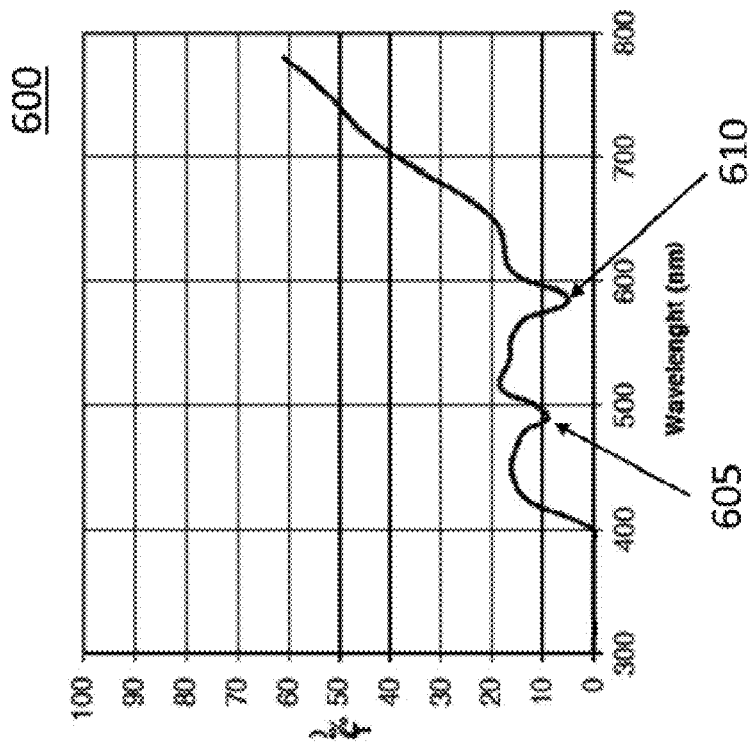
FIG. 6A is a graph showing the transmission spectrum of a blue mirrored lens according to an embodiment of the invention.
FIG. 6B is the ANSI test performance of the lens with the transmittance spectrum shown in FIG. 6A according to an embodiment of the invention.

In some situations, it may be desirable to further attenuate the red portion of the visible spectrum and/or enhance the blue region of the spectrum. A lens with these properties may have a blue appearance. The spectral properties may be desirable for certain user applications or the blue appearance of the lens may be cosmetically appealing to a user. An example transmittance spectrum 600 for a lens according to an embodiment of the invention is shown in FIG. 6A. The transmittance spectrum 600 is similar to transmittance spectrum 100. The transmittance spectrum 600 exhibits a light transmittance at 450 nm is greater than the transmittance at 480 nm, a light transmittance at 510 nm that is greater than the light transmittance at 480 nm and 580 nm, and a light transmittance at 600 nm that is greater than the light transmittance at 580 nm. The transmittance spectrum 600 has dips 605, 610 at 480 nm and 580 nm. The selective dips at 480 nm and 580 nm may provide reduced color confusion. However, there is increased transmittance in the 500 nm-550 nm region in transmittance spectrum 600 compared to transmittance spectrum 100. This may cause the lens having this transmittance spectrum to have a blue appearance. The lens may also have a mirror coating. The ANSI test results for a lens having the transmittance spectrum 600 are shown in FIG. 6B.

Figures 7A, 7B:
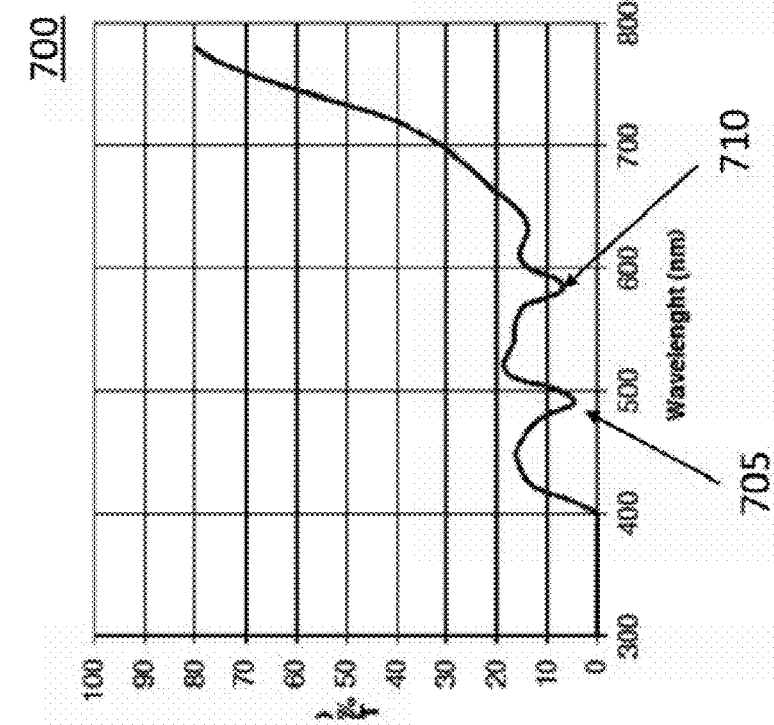
FIG. 7A is a graph showing the transmission spectrum of a second blue mirrored lens according to another embodiment of the invention.
FIG. 7B is the ANSI test performance of the lens with the transmittance spectrum shown in FIG. 7A according to another embodiment of the invention.

A further example of a transmittance spectrum 700 blue tinted polarized mirror lens according to an embodiment of the invention is shown in FIG. 7A. The lens with the transmittance spectrum 700 exhibits a light transmittance at 450 nm is greater than the transmittance at 480 nm, a light transmittance at 510 nm that is greater than the light transmittance at 480 nm and 580 nm, and a light transmittance at 600 nm that is greater than the light transmittance at 580 nm. The transmittance spectrum 700 has dips 705, 710 at 480 nm and 580 nm. The selective dips at 480 nm and 580 nm may provide reduced color confusion. In this example spectrum, the dip 705 at 480 nm is more pronounced than the dip 710 at 580 nm, which may further reduce color confusion between blue and green hues in a user. That is, the reduction in transmittance at dip 705 is greater than the reduction in transmittance at dip 710 relative to the surrounding wavelengths in the spectrum 700. The ANSI test results for a lens having the transmittance spectrum 700 are shown in FIG. 7B. As shown in the test results, the overall transmittance for the lens with the spectrum in 7A is the same as the lens with the spectrum shown in FIG. 6A, even though filtering at selective wavelengths is increased.

Different levels of light attenuation may be desirable in different conditions. For example, a user may want strong light attenuation at midday and less light attenuation in the late afternoon but may not wish to carry two separate lenses. Another example situation is users who wear corrective lenses and may not wish to remove their eyeglasses when going between indoors and outdoors. It may be possible to add compounds to a lens or coatings applied to a lens that are responsive to light such that their level of light attenuation is correlated to the intensity of light present. A lens with this capability may be referred to as photochromic. The compounds may be sensitive to ultraviolet light such that the lenses respond selectively to sunlight rather than artificial indoor lighting that may contain little or no ultraviolet light.

Figures 8A, 8B:
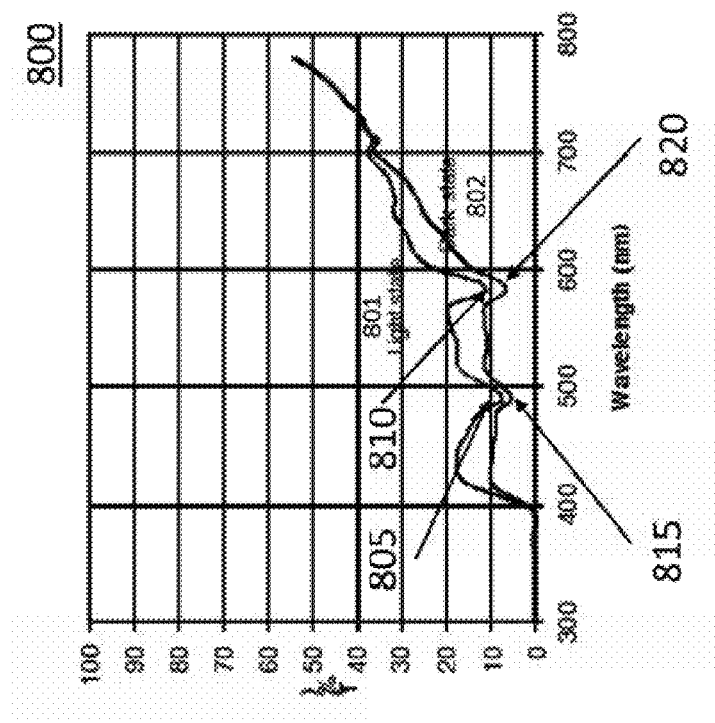
FIG. 8A is a graph showing the transmission spectra of a photochromic lens.
FIG. 8B is the ANSI test performance of the lens with the transmittance spectra shown in FIG. 8A.

FIG. 8A illustrates transmittance spectra 800 for a tinted polarized lens that responds selectively to the amount of ultraviolet light present. The light state 801 has an overall transmittance of 19%, as shown by the ANSI test results in FIG. 8B for the transmittance spectra 800, and the dark state 802 has an overall transmittance of 12%. The lens with the transmittance spectrum 800 for light state 801 and light state 802 exhibits a light transmittance at 450 nm is greater than the transmittance at 480 nm, a light transmittance at 510 nm that is greater than the light transmittance at 480 nm and 580 nm, and a light transmittance at 600 nm that is greater than the light transmittance at 580 nm. Both the light state 801 and the dark state 802, have dips 805, 815 at 480 nm and dips 810, 820 at 580 nm to reduce color confusion.

The transmittance spectra shown in FIGS. 2A, 4A, and 5-7A illustrate lenses which may contain a variety of desirable features while still maintaining selective filtering at certain wavelengths to reduce color confusion of a user. Such desirable features may include a lens having a certain appearance, a mirror coating, and/or variable attenuation response to light. The ability to selectively filter certain wavelengths in combination with other desirable features may allow for lenses to be designed for a wide variety of purposes.

Figure 9:
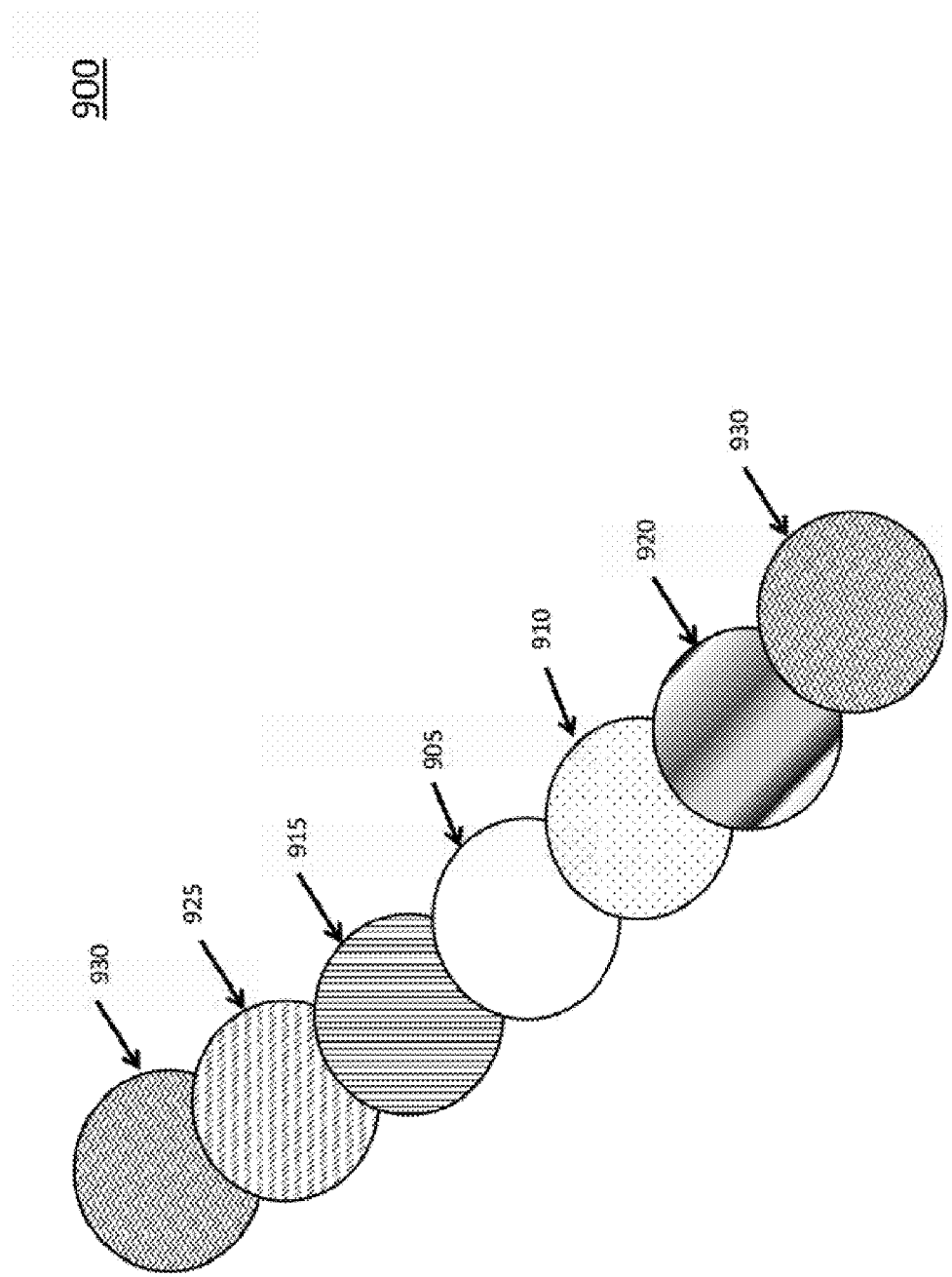
FIG. 9 is an illustration of a lens according to an embodiment of the invention.

FIG. 9 is an exploded view of an example lens 900 according to an embodiment of the invention. The lens 900 may have a transmittance spectrum, for example, one of the transmittance spectra shown in FIGS. 2A, 4A, and 5-7A. The lens 900 may be composed of multiple layers and/or films. The lens 900 may include a lens wafer 905. The lens wafer may be made of plastic, polycarbonate, glass, or other material. The lens wafer 905 may be transparent or it may contain dyes or other compounds to add tint to the lens. Optionally, the lens 900 may have a separate tinting layer 910 applied to the wafer 905 to provide the tint. The lens 900 may also have a polarizing film 915 for reducing glare as described previously. The lens 900 may also optionally contain a mirrored layer 920 for additional reduction of light transmittance. Optionally, the lens 900 may contain an anti-reflection layer 925. The anti-reflection layer 925 may prevent light from reflecting off the surfaces of the lens 900 into a user's eye. Finally, the lens 900 may optionally contain one or more anti-scratch layer 930. The anti-scratch layer 930 is a hard material that protects the lens and the films applied to it. The anti-scratch coating may also be hydrophobic to assist in repelling smudges or dirt from the lens 900.

Figure 10:
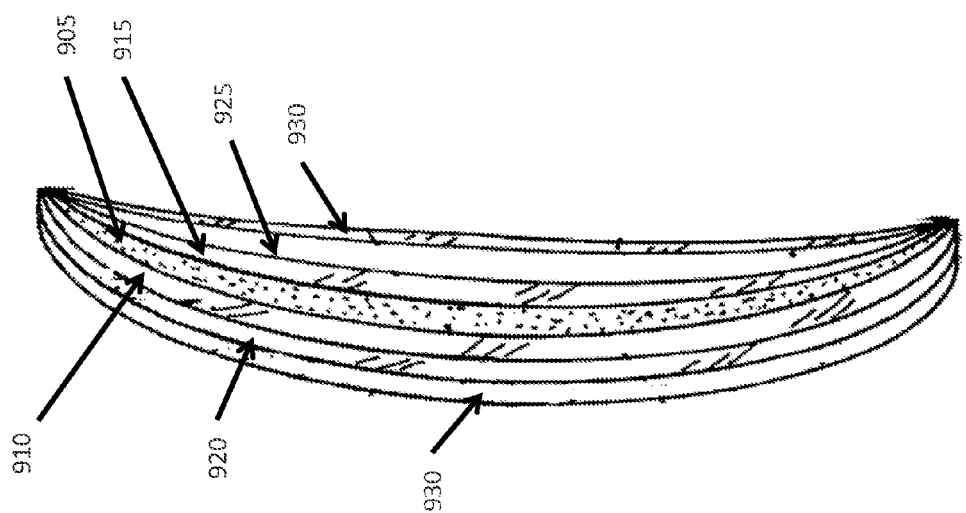
FIG. 10 is an illustration of a side view of the lens shown in FIG. 9 according to an embodiment of the invention.

FIG. 10 is a side view of lens 900 wherein all of the layers and/or films have been applied to the lens wafer 905. The thicknesses of the layers shown in FIG. 10 may not reflect the relative thicknesses of the layers of the lens 900 in all embodiments of the invention. Although FIGS. 9-10 show the layers and/or films 905-930 in a particular arrangement, other arrangements of the layers and/or films may be possible within the lens 900 without deviating from the principles of the invention. From the foregoing it will be appreciated that, although specific embodiments of the invention have been described herein for the purposes of illustration, various modifications may be made without deviating from the spirit and scope of the invention. For example, and without limitation, lenses according to an embodiment of the present invention may include a combination of the transmittance spectra of two or more lenses. Additional anti-reflective, hydrophobic, or anti-scratch coatings may also optionally be added to one or more surfaces of the lens.

What is claimed is:

1. A lens, comprising:
a lens wafer;
a compound;
a polarized film coating a surface of the lens wafer; and
wherein the polarized film and the compound are configured to impart light transmittance characteristics such that the lens will exhibit a light transmittance at 450 nm that is greater than the transmittance at 480 nm, a light transmittance at 510 nm that is greater than the light transmittance at 480 nm and 580 nm, and a light transmittance at 600 nm that is greater than the light transmittance at 580 nm; wherein the light transmittance at 480 nm is less than the light transmittance at 580 nm, when light is transmitted through the lens wafer, the compound, and the polarized film.

2. The lens of claim 1, wherein the polarized film and the compound are further configured to impart light transmittance characteristics to the lens such that the lens does not transmit any light below 400 nm.

3. The lens of claim 1, wherein light transmittance is less than 20% from 300 nm to 650 nm.

4. The lens of claim 1, wherein the light transmittance from 410 nm to 650 nm is uniform except at 480 nm and 580 nm.

5. The lens of claim 1, wherein the lens is gray in appearance.

6. The lens of claim 1, wherein the lens is brown in appearance.

7. The lens of claim 1, wherein the lens is blue in appearance.

8. The lens of claim 1, wherein the compound is contained in a film applied to a surface of the lens.

9. The lens of claim 1, wherein the lens is polycarbonate.

10. The lens of claim 1, wherein the polarized film is a polyvinyl alcohol sheet impregnated with a dye.

11. The lens of claim 10, wherein the dye comprises iodine.

12. A lens, comprising:
a lens wafer;
a compound;
a polarized film coating a surface of the lens wafer;
a mirrored coating; and
wherein the polarized film, mirror coating, and the compound are configured to impart light transmittance characteristics to the lens such that the lens will exhibit a light transmittance at 450 nm that is less than the transmittance at 480 nm, a light transmittance at 510 nm that is greater than the light transmittance at 480 nm and 580 nm, and a light transmittance at 600 nm that is greater than the light transmittance at 580 nm, wherein the light transmittance for every wavelength from 400 nm to 480 nm is less than the transmittance for every wavelength from 600 nm to 700 nm, when light is transmitted through the lens wafer, the compound, and the polarized film.

13. The lens of claim 12, further comprising an anti-reflective coating.

14. The lens of claim 12, further comprising an anti-scratch coating.

15. The lens of claim 12, wherein the lens is brown in appearance.

16. The lens of claim 12, wherein the overall light transmittance is less than 10% from 300 nm to 500 nm.

17. A lens, comprising:
a lens wafer;
a compound;
a polarized film coating a surface of the lens wafer; and
wherein the polarized film and the compound are configured to impart light transmittance characteristics to the lens such that the lens will exhibit a light transmittance at 450 nm that is greater than the transmittance at 480 nm, a light transmittance at 510 nm that is greater than the light transmittance at 480 nm and 580 nm, and a light transmittance at 600 nm that is greater than the light transmittance at 580 nm, wherein the light transmittance at 450 nm is greater than the transmittance at 650 nm, when light is transmitted through the lens wafer, the compound, and the polarized film.

18. The lens of claim 17, further comprising a mirrored coating.

19. The lens of claim 17, wherein the compound is contained in a film applied to a surface of the lens.

20. The lens of claim 17, wherein the lens is polycarbonate.

21. The lens of claim 17, wherein the lens is blue in appearance.

22. The lens of claim 17, further comprising an anti-scratch coating.

* * * * *